April 21, 1931.  F. HUNZIKER  1,801,601
AUTOMATIC INDEXING MECHANISM
Filed Oct. 24, 1929  4 Sheets-Sheet 1
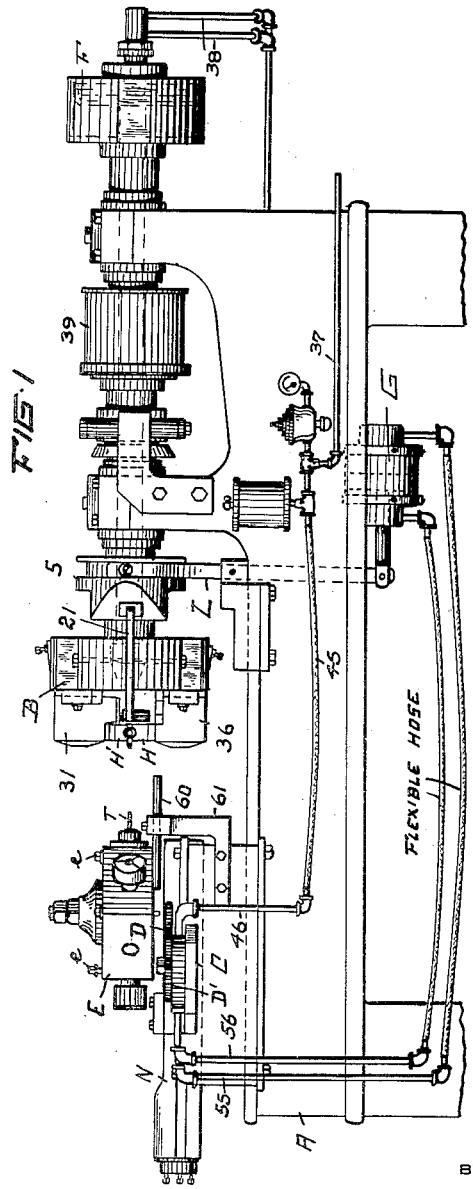
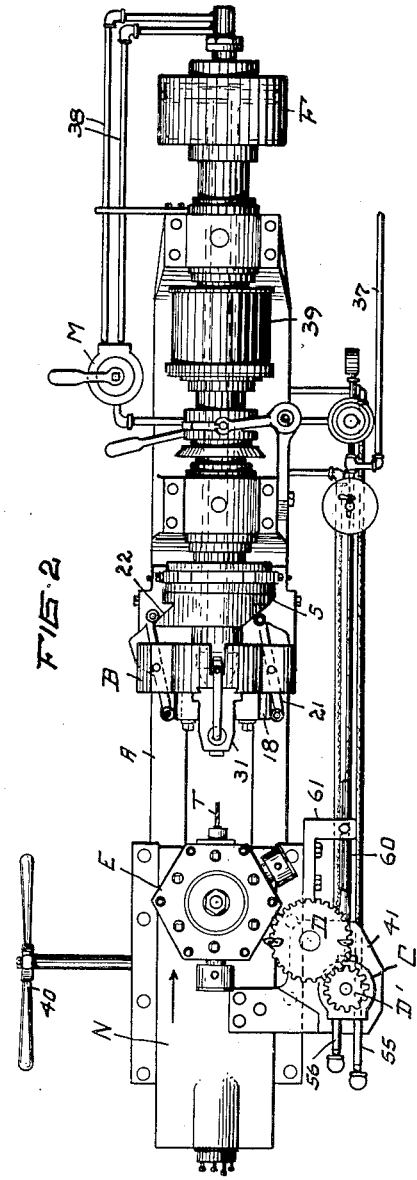
INVENTOR
FRED HUNZIKER
BY Fisher, Moser & Moore
ATTORNEY April 21, 1931.  F. HUNZIKER  1,801,601
AUTOMATIC INDEXING MECHANISM
Filed Oct. 24, 1929   4 Sheets-Sheet 2
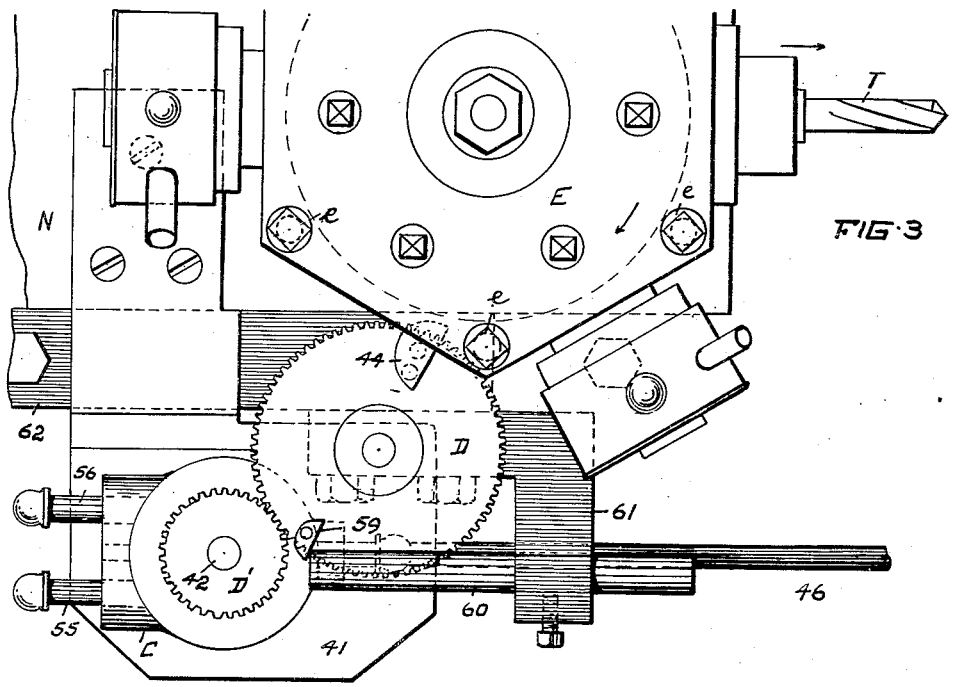
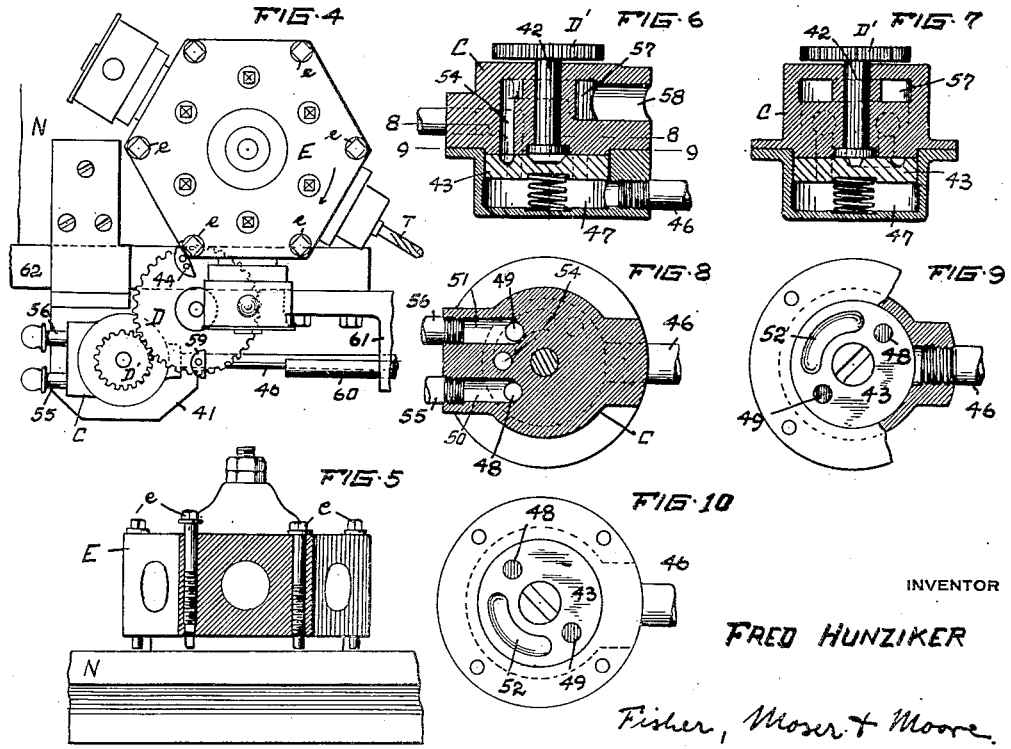
INVENTOR
FRED HUNZIKER
Fisher, Moser & Moore
ATTORNEY

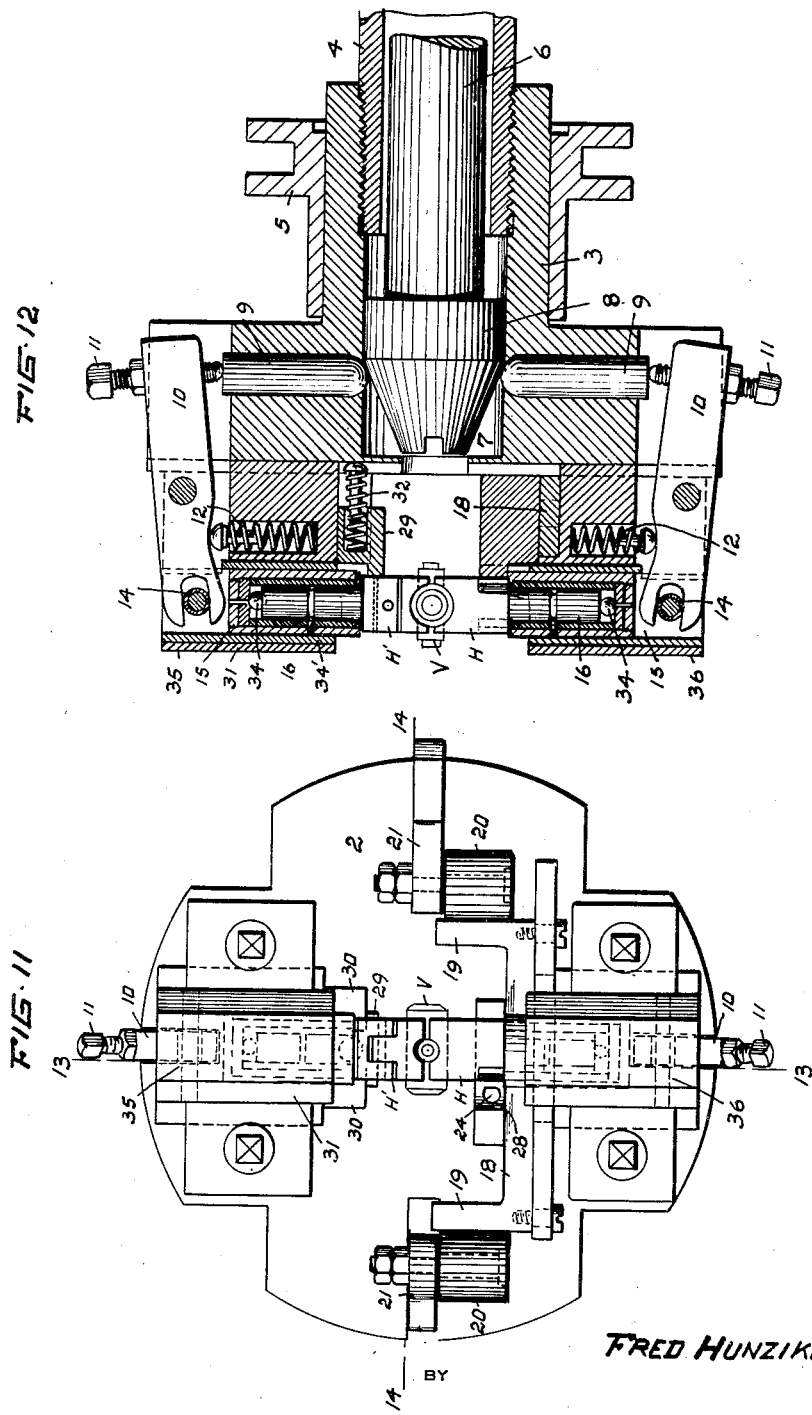

April 21, 1931.  F. HUNZIKER  1,801,601
AUTOMATIC INDEXING MECHANISM
Filed Oct. 24, 1929  4 Sheets-Sheet 4
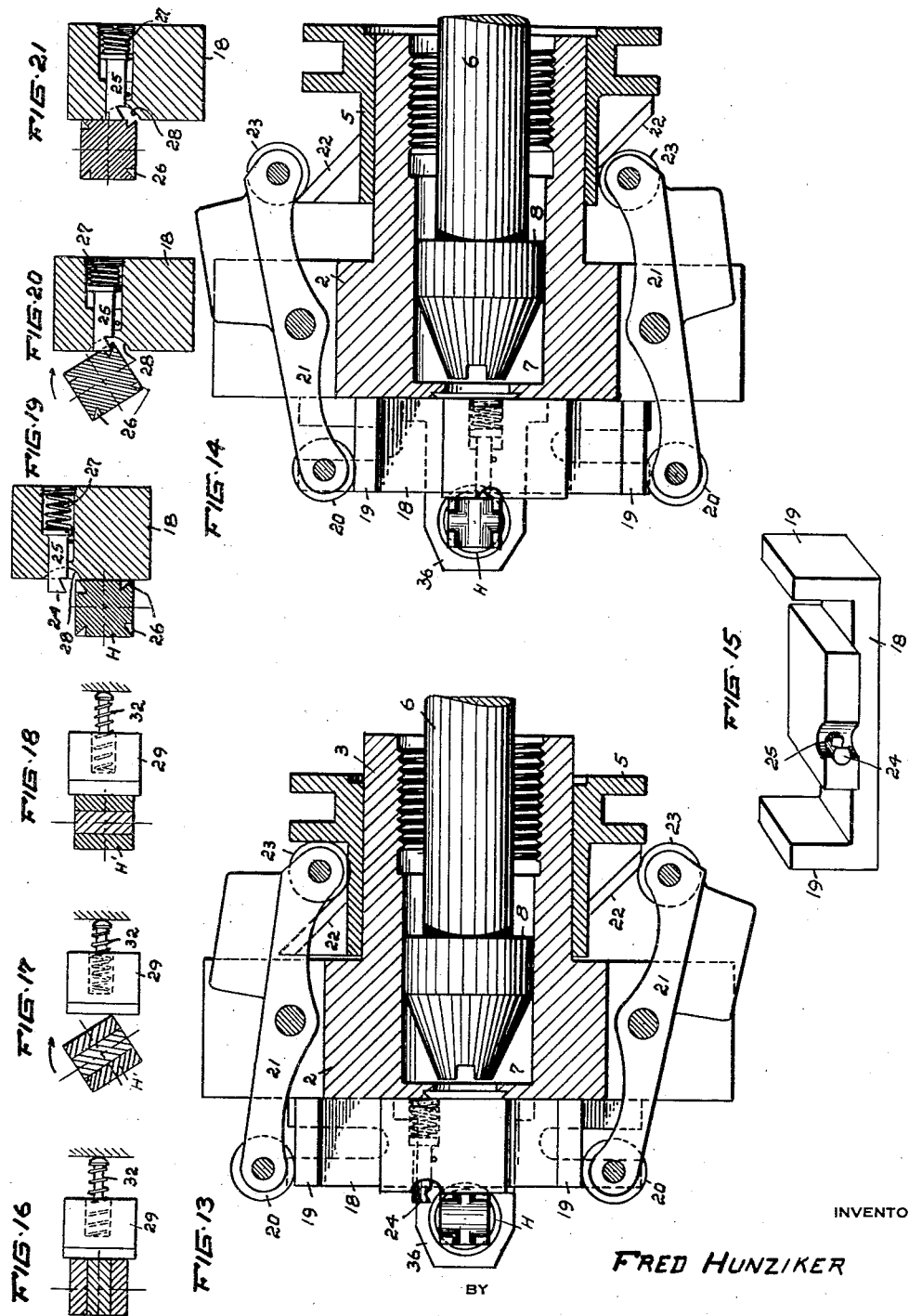
INVENTOR
FRED HUNZIKER
BY
Fisher, Moser & Moore
ATTORNEY Patented Apr. 21, 1931

1,801,601

UNITED STATES PATENT OFFICE

FRED HUNZIKER, OF CLEVELAND, OHIO, ASSIGNOR OF ONE-HALF TO THE W. J. SCHOENBERGER COMPANY, OF CLEVELAND, OHIO, A CORPORATION OF OHIO

AUTOMATIC INDEXING MECHANISM

Application filed October 24, 1929. Serial No. 402,060.

The present invention relates to an air-operated indexing attachment for a turret lathe or any other machine in which an indexing chuck is employed, and the invention is especially applicable to and useful in a turret lathe using an indexing chuck of the type and kind shown and described in my co-pending application for patent, Ser. No. 402,061, filed on even date herewith. In general my object is to provide an improved indexing means adapted to be operated by compressed air or other fluid, which may be readily regulated and adjusted, and which will promote accurate and speedy indexing of the work gripped in the chuck, especially a piece or part of angular formation or a part requiring machining at different angles, without stopping the machine or the revolution of the chuck.

In the accompanying drawings, Fig. 1 is a side elevation of a turret lathe embodying my improved indexing means, and Fig. 2 is a top view thereof. Fig. 3 is an enlarged top view of a part of the turret, the indexing devices associated therewith, and Fig. 4 is a top view of the same parts on a smaller scale and in different positions. Fig. 5 is a sectional view vertically through a part of the turret showing the adjustable indexing pins therein. Figs. 6 to 10, inclusive, are sectional views and elevations of the air valve operated by the rotatable movements of the turret, Figs. 6 and 7 being vertical sections on planes at right angles through the center of the valve body, and Figs. 8 and 9 being horizontal sections on lines 8—8 and 9—9 of Fig. 6, respectively. Fig. 10 is a view corresponding to Fig. 9 showing the valve disk rotated a quarter turn to reverse the flow of compressed air and the exhaust. Fig. 11 is a front view of the indexing chuck, and Fig. 12 is a sectional view longitudinally thereof with the chuck jaw closed upon a piece of work. Fig. 13 is a sectional view of the chuck on line 13—13 of Fig. 11, and Fig. 14 a corresponding view with the work-holding jaw rotated a quarter turn and locked against further rotation. Fig. 15 is a perspective view of the cross slide for rotating and locking the work-holding jaws. Figs. 16 to 21 are sectional views of the work-holding jaws and their respective locking members in different operating positions.

The turret lathe A shown in the drawings corresponds in the main to a lathe of a known type and kind in common use, excepting for my automatic indexing attachment which includes an indexing chuck B, an air valve C operatively controlled by changeable indexing gears D associated with the rotatable turret E of the lathe, and a pair of air cylinders F and G, respectively, containing pistons for controlling the movements of a pair of indexing jaws H and H' in chuck B. The piston in cylinder F functions to open and close the work-holding jaws, and the piston in cylinder G operates the mechanism which rotates the same jaws and indexes the work, or in other words turns the work to different angular positions in respect to the tools T in turret E.

For a better understanding of the invention and the operations thereof, the indexing chuck B will be first described. Thus, referring to Figs. 11 to 21, inclusive, the chuck comprises a circular body 2 having a round axial extension or hub 3 adapted to be screw-connected with a revoluble shaft or spindle 4 of the lathe. A slidable collar 5 is sleeved upon extension 3, and a pivoted lever L extends downwardly therefrom to cylinder G and its air operated piston, wherewith the indexing operations may be controlled by admitting compressed air into the cylinder while the chuck is revolving. A reciprocable plunger 6 extends through spindle 4 into an axial bore 7 in chuck body 2, and this plunger is connected to the piston in cylinder F. A beveled head or tapered enlargement 8 on the plunger engages the rounded inner ends of a pair of pins 9—9 arranged to slide diametrically within body 2 opposite the corresponding ends of a pair of oscillatory levers 10—10 respectively. Each lever is pivoted at its middle and one end carries an adjustable set screw 11 held constantly in contact with the outer end of operating pin 9 by a coiled spring 12 engaged with the opposite end of the lever, see Fig. 12. The front end of each lever 10 is slotted or bifurcated to connect with a cross pin or roller 14 carried by a cylindrical sleeve or member 15 in which the spindle or stem 16 of a work-holding jaw is rotatably supported. Two such jaws H and H', are axially aligned diametrically of the chuck face, and their gripping ends are recessed at right angles, or fashioned or shaped in any suitable way to receive the part or piece to be operated upon.

As delineated, the jaws shown are designed to clamp a cock or valve body V of cross shape between them, or a correspondingly shaped part having one or more angularly-related branches, and in machining operations the main body and the branches are drilled at right angles, and counterboring as well as screw-threading and other finishing operations are required.

The present chuck permits each angular part to be presented separately to a tool in the turret, and to be operated upon successively while the chuck is revolving. To effect satisfactory results rapidly and expeditiously, the work-holding jaws are rotated on their axes with a snap movement and locked positively in a squarely-aligned position with the tool carried forward by the turret. One or more tools may be caused to operate on the same branch of the cock before rotating the jaws and cock together to bring a second branch in axial alignment with the same or other tools in the turret.

The means for operating and indexing the work-holding jaws include a reciprocable member or cross slide 18 seated between the face of chuck body 2 and one of the jaws, jaw H for example and which for convenience may be termed the lower jaw, inasmuch as it so appears in Figs. 11 and 12. Slide 18 has two upright ends 19—19 engaged by rollers 20—20 carried by a pair of oscillatory arms 21—21 which are pivotally supported between their opposite ends upon opposite sides of chuck body 2, see Figs. 11 and 13. The arms 21 lie in a plane at right angles to the plane in which the levers 10 are situated, and their rear extremities carry rollers 23—23 which are engaged by and ride upon inclined ribs or cams surfaces 22—22 on collar 5. When this collar is reciprocated longitudinally on its support 3 the cross slide 18 is shifted back and forth in respect to jaw H. The movement of cross slide 18 in one direction brings the notched end 24 of a spring-pressed bolt 25 into engagement with one notched corner 26 at the base of the lower jaw H', which is square or flat-sided. Bolt 25 and spring 27 are confined within cross slide 18 and the flat front face of this slide is recessed at 28 where the notched end 24 of the bolt protrudes. The flat side of slide 18 locks jaw H' against rotatable movement when the slide is at rest, but when the slide is shifted and the notched end 24 engages a notched corner of the flat sided jaw H, that corner has freedom to turn in the recess 28 in the flat side of the slide, see Fig. 20. Then as the slide moves onward, the spring-pressed bolt is forced inward until the slide carries the bolt past the center of turning movement of the jaw. Then the bolt rotates the jaw with a snap movement until the flat side of the jaw strikes and rests flush against the flat side of the cross slide, thereby completing the quarter turn movement of the jaw and locking the same squarely and rigidly to receive the operating tool carried by the turret. The return movement of the cross slide may precede or follow the machining operation, and locking of the rotatable jaw will be effected in either position.

As an aid to locking and turning both jaws and the work, a second or supplementary spring-pressed member 29 is employed for the upper jaw H', see Figs. 12 and 16. Member 29 is a rectangular piece of metal grooved to slide between two channeled strips 30 fixed to the bottom of an adjustable block 31 carrying the upper jaw H', which is also square or flat-sided where exposed opposite said locking and turning member 29. A coiled spring 32 presses member 29 tightly against upper jaw H', see Fig. 12, but when the lower jaw is rotated the work clamped between the jaws causes the upper jaw to rotate likewise. Member 29 yields until the square corner of upper jaw H' passes the center line, whereupon spring 32 co-acts with spring 27 behind bolt 25 to rotate both jaws a full quarter and to lock the same when so turned, see Figs. 16 to 21 inclusive. Locking member 29 and slide 18 also hold the jaws in fixed relation when the jaws are open and not clamping a piece of work between them.

The spindles or round stems 16 have rotatable bearing within removable bushings carried by the cylindrical supporting members 15, and a ball bearing 34 is also preferably employed at the outer end of the stem. The cylindrical supporting members 15 are also arranged to slide in bushings 34' confined within the front overhanging ends 35 of a pair of adjustable blocks 31—36 which are clamped diametrically opposite each other upon the face of body 2. Blocks 31—36 are flanged and dove-tailed to slide upon the face of chuck body 2, and the levers 10 are confined in end slots in these blocks and are pivotally supported thereby. When blocks 31—36 are adjusted to place them nearer or farther apart, the set screws 11 are also adjusted to maintain a proper working relationship between the levers and their respective operating pins 9. The cross slide 18 is mounted in a guide way at the top of lower block 36 and the operating member 29 for upper jaw H' is mounted upon upper block 31. Consequently, when these blocks are adjusted the working parts associated with the two jaws will not be disturbed, and different sizes and kinds of work may be clamped between the jaws and operated upon.

The opening and closing movement of the chuck jaws H—H' is controlled primarily by a three-way valve M located conveniently at one side of the lathe within reach of the operator. This valve is coupled to a supply pipe 37 leading to a source of compressed air, see Fig. 2, and two distributing pipes 38 connect this valve with cylinder F to control the movements of the piston therein and reciprocate plunger 6. The lathe is driven in any suitable way, for example, by a belt pulley 39, and the rotatable turret E is mounted on a slide N which is reciprocated by feed mechanism such as used generally in turret lathes having a manually operable wheel 40 or other device to control the same. In operation the slide is moved forward and a given tool T in the turret is fed to the rapidly revolving work in the chuck. Upon the return movement of the slide the tool is withdrawn from the work and the turret turns automatically in a given degree to bring a second tool in line with the work. In the present machine the intermittent rotation of the turret is utilized to rotate a pair of large and small gears D and D' respectively, mounted on a bracket 41 fastened to slide N of the lathe. Small gear D' is secured to the stem 42 of a disk-shaped valve member 43 in valve body C, and a partial turn of the turret will rotate disk member 43 a quarter turn. Thus, turret E is provided with a series of vertically-disposed screw-threaded pins —e— radially thereof, and these pins may be raised and lowered. When one or more are lowered the end or ends project a slight distance beneath the bottom border edge of the turret where they may strike a lug 44 on large gear D when the turret is rotated, thereby rotating the gears D—D' and valve disk 43. As the turret revolves to its appointed place of rest the pin frees itself from the lug and the oscillatory valve disk is placed in one of its two working positions, whereby compressed air will be admitted into one end of cylinder G and an exhaust passage opened at its opposite end at the same time. The supply of air is obtained from pipe 37 by way of a flexible tube 45 which connects with a pipe 46 at one side of valve body C, see Figs. 6 to 10. The air enters a bottom chamber 47 beneath valve disk 43 and thence passes upwardly through the disk by way of one or the other of two inlet openings 48 and 49 respectively, which are adapted to register with a pair of right-angular passages 50 and 51 respectively, in the upper half of the valve body. However, when inlet opening 48 is in register with port 51 inlet opening 49 is closed. Rotation of the disk will then bring inlet opening 49 in register with port 51 and close inlet opening 48.

The upper face of disk 43 is also formed with an arc-shaped groove 52 intermediate the two air inlet openings 48 and 49. This groove is always in register with and open to a vertical exhaust duct 54 in valve body C. Thus, when the disk is turned in one direction the groove communicates with port 51 and exhaust port 54, and when rotated reversely the same duct is open to port 50. In the first instance the compressed air passes through the inlet opening 48 in the valve disk into one angular port 50 and thence through a pipe 55 to one end of cylinder G, and the opposite end of the cylinder is opened to the atmosphere by way of a second pipe 56 leading to port 51, groove 52, and exhaust duct 54 which opens into a chamber 57 in the upper part of the valve body, see Figs. 6 and 8. Chamber 57 has an outlet 58 open to the atmosphere.

To reverse the flow of compressed air to cylinder G and at the same time exhaust the air in the opposite end of the same cylinder, the valve disk is rotated reversely. That result is effected when the turret carrying slide N is moved forward, inasmuch as such movement brings a second lug or projection 59 on large gear D, diametrically opposite the first lug 44, into contact with a stop member 60 comprising a rod or shaft fixed adjustably on an arm 61 bolted to the side of the body or frame 62 of the lathe, see Fig. 3. The reverse oscillatory movement of gear D reverses the valve disk 43 and the flow of air in cylinder G, thereby actuating lever L and collar 5 for the indexing chuck C. The movement imparted in that way to collar 5 reverses the position of the indexing and locking cross slide 18 in the chuck, that is, the cross slide 18 is returned to its original position, shown in Fig. 13, thereby setting it for the next indexing operation. The jaws are not rotated on the return movement of the slide, because the flat surface of the cross slide constantly engages the flat side of lower jaw H to lock the jaw against rotatable movement, and because the latch or bolt 25 is pressed inwardly and unhooked from the corner tooth on the jaw, see Fig. 14. Thus in reviewing the operation, it will be seen that when the turret slide and tool is retired in respect to the work and the turret E is rotated to bring a new tool in line with the work, that air valve C is rotated to deliver compressed air into one end of cylinder G, thereby operating lever L and collar 5 to shift the indexing slide 18 in one direction across the face of the chuck, thereby rotating the jaws H—H' and the work a quarter turn and also locking the jaws and the work in squared alignment with the operating tool in the turret. Then while the turret advances and carries the tool toward the indexed work, the stop member 60 in the path of lug 59 reverses valve disk 43 and returns the indexing slide 48 in chuck C to its starting position where it will lock the jaws rigidly against turning while the tool is operating on the work clamped between the jaws and the chuck is revolving. Stop member 60 is preferably set to reverse the valve and return the indexing slide 18 to its locking position before the tool engages the work.

What I claim, is:

1. An automatic chuck indexing mechanism for turret lathes, comprising a revoluble indexing chuck, an air cylinder and means associated therewith for operating said indexing chuck, and means including an air valve having operating connections with the lathe turret to operate said valve during indexing proceedings and air connections with said cylinder to control the indexing operation of said chuck operating means.

2. An automatic chuck indexing mechanism for turret lathes, comprising a revoluble work-holding chuck having an indexing slide therein, means for reciprocating said slide, and an air cylinder to actuate said means, in combination with a rotatable valve and gearing connected to and operating said valve, said gearing being operatively associated with the lathe turret and said valve being connected with said cylinder to control the flow of air to said cylinder.

3. An automatic chuck indexing mechanism for turret lathes, comprising a revoluble chuck having rotatable and slidable chuck jaws, separate air cylinders, and for rotating said jaws coupled with one of said cylinders and means for opening and closing said jaws coupled with the other one of said cylinders, said first means including a valve and gears operatively dependent upon the rotatable movements of the turret and said valve having air connection with the first one of said cylinders and a supply of compressed air.

4. An automatic chuck indexing mechanism for turret lathes, comprising a revoluble chuck having rotatable indexing jaws and means to open and close said jaws, including an air cylinder having valved air connections with a source of compressed air, in combination with a double-acting air valve having gearing operatively associated with the rotatable turret of the lathe for controlling the rotatable indexing movements of the chuck jaws.

5. An automatic chuck indexing mechanism for turret lathes, comprising a revoluble chuck embodying a slidable indexing member operatively connected with a collar, a lever operatively connected with said collar, an air cylinder containing a piston connected to said lever and having pipe connection with a supply of compressed air, a reversible valve and gearing therefor connected to and operating said valve and operatively associated with the movable turret of said lathe, and flexible pipe connections between said valve and said cylinder.

6. An automatic chuck indexing mechanism for turret lathes, including a slide and a rotatable turret, a rotatable air valve and changeable gears therefor mounted upon said slide, adjustable means radially of the turret for rotating one of said gears in one direction by the rotatable movement of the turret, and adjustable means stationed in the path of movement of one of said gears for reversing said valve rotatably upon feed movements of said slide.

7. In an automatic chuck indexing mechanism for turret lathes, a rotatable turret and a supporting slide therefor, an indexing chuck opposite said turret, an air cylinder and means associated therewith for operating said indexing chuck, a reversible air valve connected with said cylinder, gears for operating said valve mounted on said slide adjacent said turret, adjustable devices carried by said turret adapted to operate said gears and valve, and an adjustable device stationed in the path of movement of said slide adapted to reverse said gears and valve.

8. In an automatic chuck indexing mechanism for turret lathes, a rotatable tool support; a revoluble chuck having rotatable indexing jaws opposite said tool support; means, including a slidable collar for rotating said indexing jaws; and means, including an air cylinder for reciprocating said collar, a valve having pipe connections with said cylinder, and means operatively dependent upon the rotatable movements of said turret for operating said valve.

9. In an automatic chuck indexing mechanism for turret lathes, a rotatable turret and a supporting slide therefor; a revoluble chuck having rotatable indexing jaws opposite said turret; a reciprocable collar and means for operating said indexing jaws; an oscillatory lever connected with said collar; an air cylinder having a piston connected to said cylinder; a reversible air valve having pipe connection with opposite ends of said cylinder; gears for operating said valve; means on said turret for rotating said gear in one direction; and means on said lathe for rotating said gear in a reverse direction upon the feed movement of said slide.

10. In an automatic chuck indexing mechanism for turret lathes, a slide carrying a rotatable turret, a reversible air valve carried by said slide adjacent said turret, a rotatable member connected with said valve having a pair of projections radially of the turret adjustable means on said turret adapted to engage one of said projections when the turret is rotated, and an adjustable engaging member stationed in the path of movement of the second projection on said rotatable member to reverse the rotatable movement thereof upon a feed movement of said slide.

In testimony whereof I affix my signature.

FRED HUNZIKER.